(12) United States Patent
Bunnell et al.

(10) Patent No.: US 9,474,327 B2
(45) Date of Patent: Oct. 25, 2016

(54) SOLE STRUCTURE MASTERS, SOLE STRUCTURE MOLDS AND SOLE STRUCTURES HAVING INDICIA AND/OR TEXTURE

(71) Applicant: NIKE, Inc., Beaverton, OR (US)

(72) Inventors: Dennis D. Bunnell, Vancouver, WA (US); Michael Hughes, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 471 days.

(21) Appl. No.: 13/969,958

(22) Filed: Aug. 19, 2013

(65) Prior Publication Data
US 2015/0047231 A1 Feb. 19, 2015

(51) Int. Cl.
*B29D 35/12* (2010.01)
*A43B 3/00* (2006.01)
*A43B 13/22* (2006.01)

(52) U.S. Cl.
CPC ........... *A43B 13/223* (2013.01); *A43B 3/0078* (2013.01); *B29D 35/122* (2013.01); *B29D 35/128* (2013.01)

(58) Field of Classification Search
CPC B29D 35/122; B29D 35/128; A43B 3/0078; A43B 3/0089
See application file for complete search history.

(56) References Cited

U.S. PATENT DOCUMENTS

| | | | |
|---|---|---|---|
| 1,960,583 A * | 5/1934 | Harding | B29D 35/0018 164/15 |
| 4,564,737 A | 1/1986 | Burke et al. | |
| 4,752,352 A | 6/1988 | Feygin | |
| 4,770,824 A | 9/1988 | Blom | |
| 4,910,887 A * | 3/1990 | Turner | A43B 3/0078 36/114 |
| 5,048,203 A * | 9/1991 | Kling | A43B 3/0078 36/25 R |
| 5,391,856 A | 2/1995 | Minamida et al. | |
| 5,660,668 A | 8/1997 | Matheson et al. | |
| 5,705,254 A | 1/1998 | Morinaga et al. | |
| 5,792,411 A | 8/1998 | Morris et al. | |
| 5,880,430 A | 3/1999 | Wein | |

(Continued)

FOREIGN PATENT DOCUMENTS

| | | |
|---|---|---|
| DE | 19851117 | 5/2000 |
| DE | 10059802 | 6/2002 |

(Continued)

OTHER PUBLICATIONS

DMG Mori Seki brochure downloaded from Internet prior to Aug. 19, 2013.

(Continued)

*Primary Examiner* — Robert B Davis
(74) *Attorney, Agent, or Firm* — Banner & Witcoff, Ltd.

(57) ABSTRACT

A sole structure may include a protected region at least partially defined by side walls of one or more sole structure features. The sole structure may further include indicial features formed in the protected region. The indicial features may have shapes of information-conveying indicia. A sole structure master corresponding to the sole structure may have indicial elements corresponding to the indicial features in a master indicial region corresponding to the protected region. A mold corresponding to the sole structure may have indicial elements corresponding to the indicial features in a mold indicial region corresponding to the protected region. A sole structure master modeling a sole structure may have textures formed on one or more surfaces by a laser.

7 Claims, 19 Drawing Sheets

(56) References Cited

U.S. PATENT DOCUMENTS

| | | |
|---|---|---|
| 6,122,564 A | 9/2000 | Koch et al. |
| 6,617,543 B1 | 9/2003 | Yang |
| 6,766,878 B2 | 7/2004 | Widmer et al. |
| 6,937,921 B1 | 8/2005 | Mazumder |
| 7,139,633 B2 | 11/2006 | Mazumder et al. |
| 7,192,000 B2 | 3/2007 | Mak |
| RE39,555 E | 4/2007 | Stahl |
| 7,767,263 B2 | 8/2010 | Tang |
| 7,985,358 B2 | 7/2011 | Han et al. |
| 8,048,093 B2 | 11/2011 | Mapes et al. |
| 8,189,318 B2 * | 5/2012 | Norton .................. A43B 1/009 361/223 |
| 2002/0035793 A1 * | 3/2002 | Byrd .................... A43B 1/0072 36/8.4 |
| 2002/0165634 A1 | 11/2002 | Skszek |
| 2004/0154153 A1 | 8/2004 | Scanni et al. |
| 2005/0087521 A1 | 4/2005 | Yang |
| 2007/0096359 A1 | 5/2007 | Torfs et al. |
| 2008/0110869 A1 | 5/2008 | Chen |
| 2009/0181214 A1 | 7/2009 | Yang |
| 2010/0007045 A1 | 1/2010 | Hsu et al. |
| 2010/0023155 A1 | 1/2010 | Conrad |
| 2010/0122476 A1 | 5/2010 | Le et al. |
| 2010/0156007 A1 | 6/2010 | Huang et al. |
| 2010/0287788 A1 * | 11/2010 | Spanks ................ A43B 1/0027 36/19.5 |
| 2010/0320180 A1 | 12/2010 | Gates |
| 2011/0095033 A1 | 4/2011 | Hung |
| 2011/0311764 A1 | 12/2011 | Hulseman et al. |
| 2012/0021182 A1 | 1/2012 | Doan et al. |
| 2012/0138219 A1 | 6/2012 | Simpson et al. |

FOREIGN PATENT DOCUMENTS

| | | | | |
|---|---|---|---|---|
| DE | 202011110219 U1 * | 3/2013 | ........... | A43B 3/0078 |
| WO | WO 2007043651 A1 * | 4/2007 | ........... | A43B 13/223 |

OTHER PUBLICATIONS

Document titled "3D Laser Texturing for Mold Makers and Design Studios," downloaded from Internet on Apr. 16, 2013.
Enlarged part of p. 3B of DMG Mori Seki brochure downloaded from Internet prior to Aug. 19, 2013.

* cited by examiner

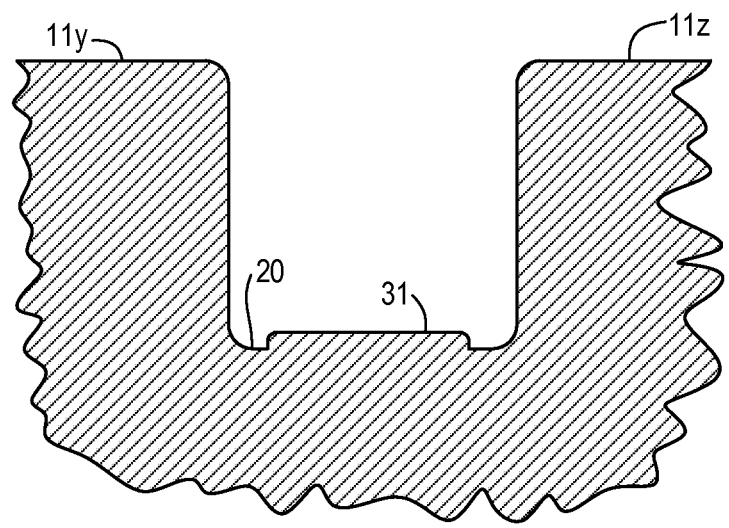
FIG. 2A1
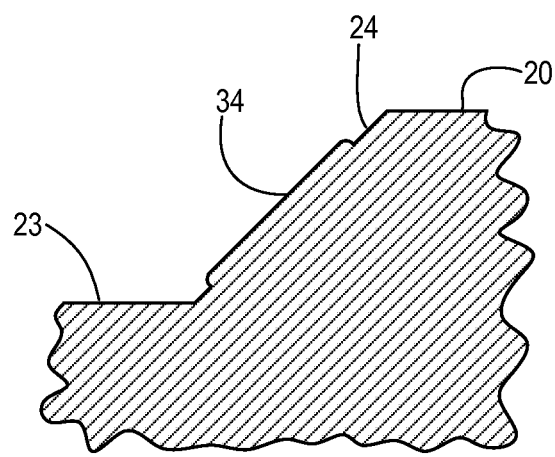
FIG. 2B1

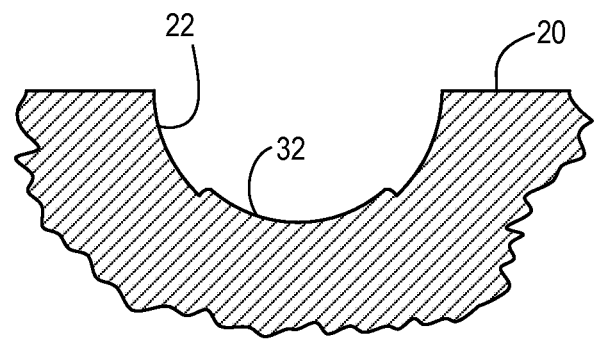
FIG. 2C1
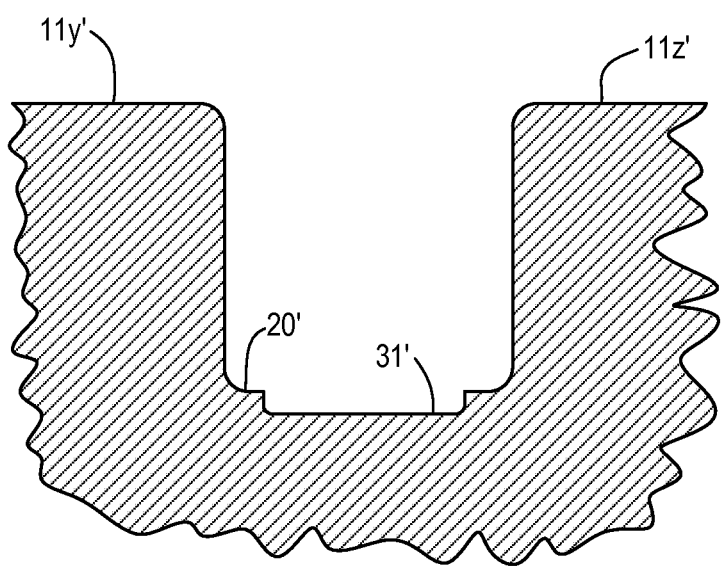
FIG. 2A2

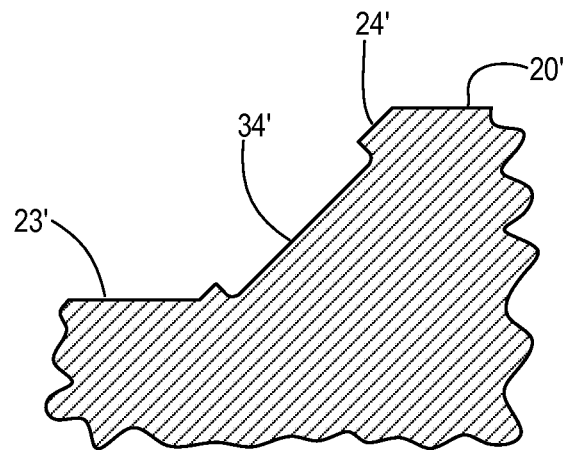
FIG. 2B2
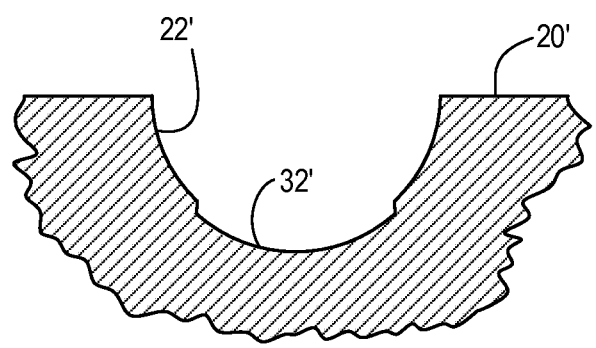
FIG. 2C2

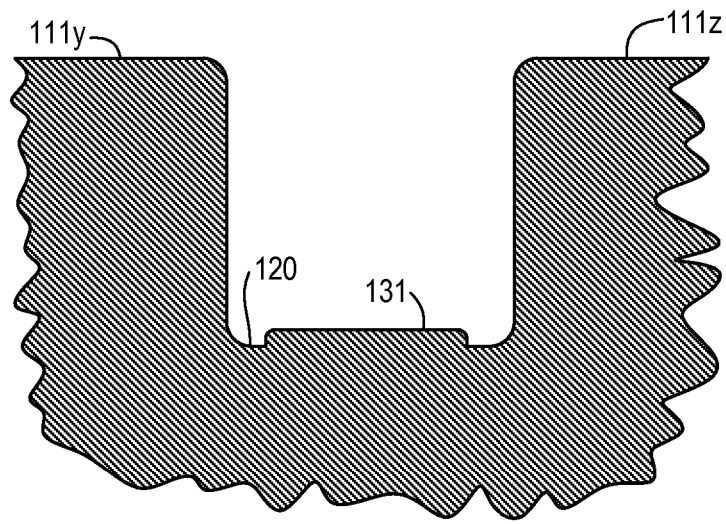
FIG. 4A1
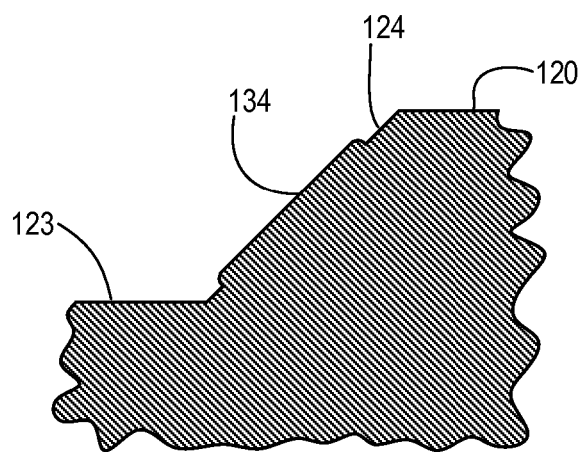
FIG. 4B1

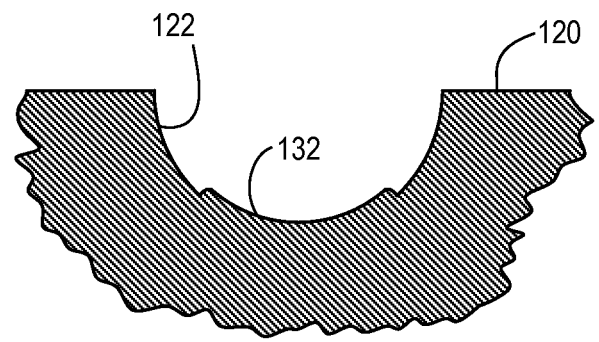
FIG. 4C1
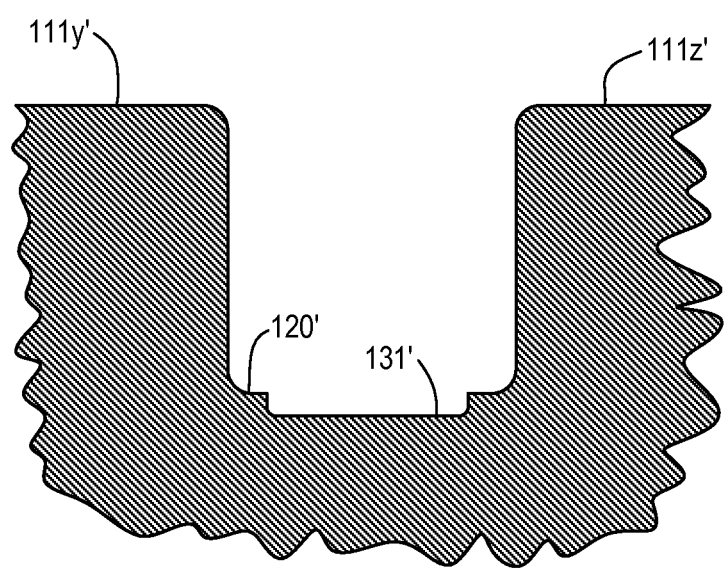
FIG. 4A2

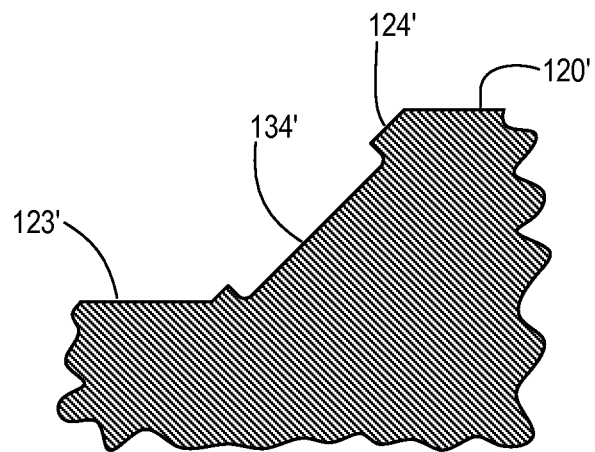
FIG. 4B2
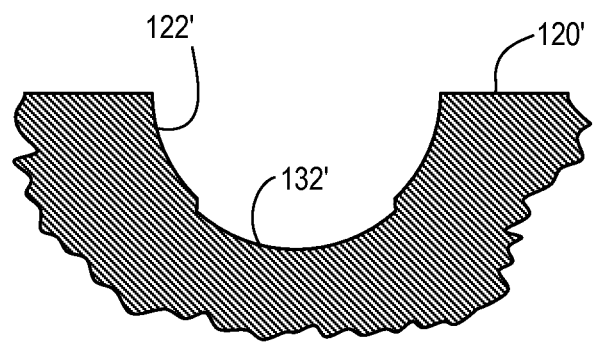
FIG. 4C2

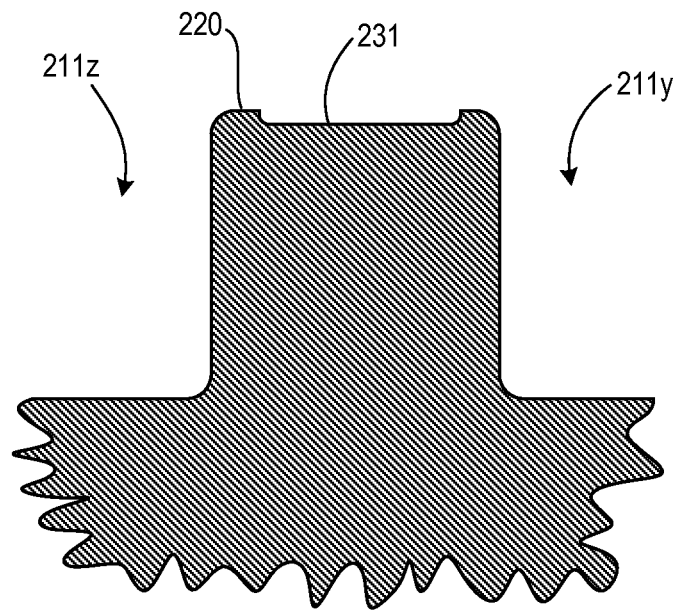
FIG. 6A1
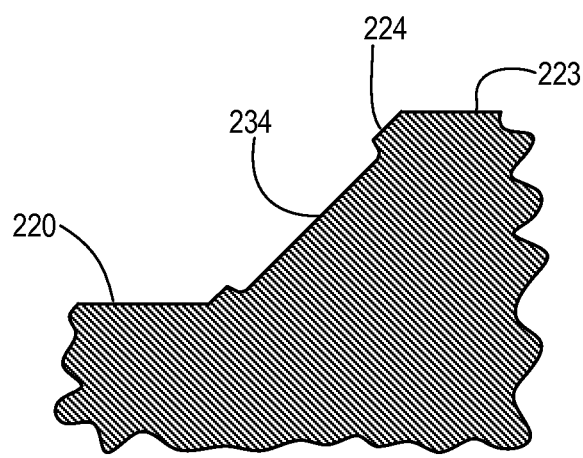
FIG. 6B1

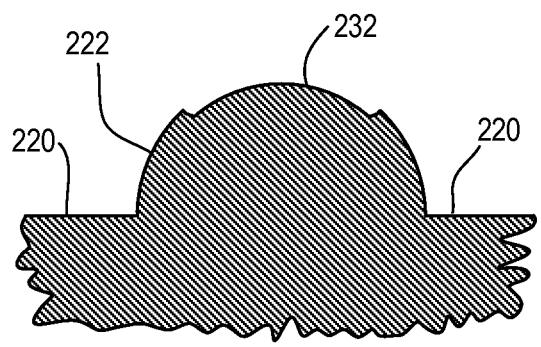
FIG. 6C1
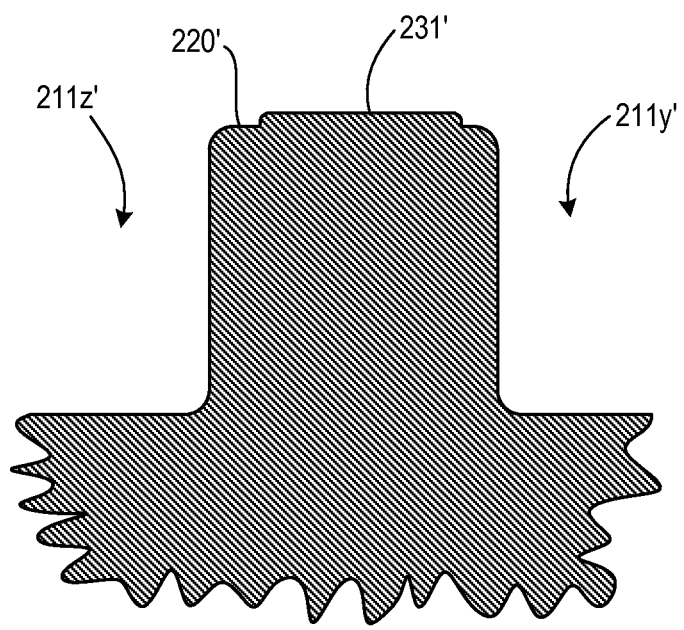
FIG. 6A2

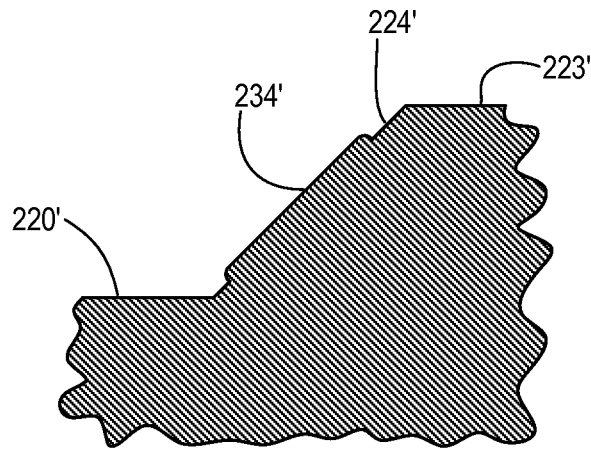
FIG. 6B2
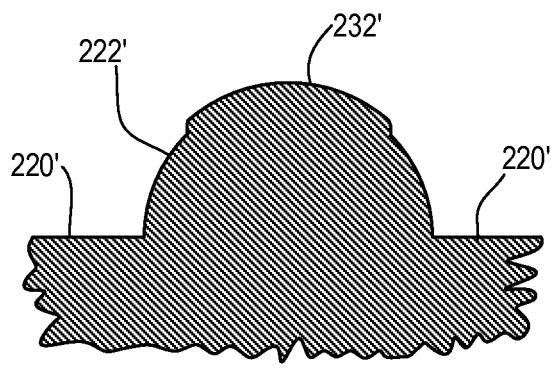
FIG. 6C2

SOLE STRUCTURE MASTERS, SOLE STRUCTURE MOLDS AND SOLE STRUCTURES HAVING INDICIA AND/OR TEXTURE

BACKGROUND

An outsole is an exposed portion of a sole structure on the bottom of a shoe. Because an outsole may contact the ground when a wearer of the shoe walks, runs or otherwise moves about, it is common for an outsole to include various types of features. Examples of functional features include lugs and other types of traction elements. Other examples may include grooves, sipes or other types of recesses formed in an outsole so as to increase traction or flexibility of a sole structure.

Outsoles are typically formed by molding one or more pieces of outsole material such as synthetic rubber. An outsole mold normally has features that correspond to features that will be formed in a molded outsole. For example, a mold may include various depressions that correspond to outsole lugs, may include ridges that correspond to outsole grooves, etc. Outsole molds can be fabricated in various ways. As one example, a mold may be cast from molten metal. A plug made from sand or other silicate material and having the outsole contours may be used to cast the outsole mold. The plug may be created from an outsole master, a metal component having the same shape and features as the outsole. An outsole master is normally machined from a larger piece of metal.

Other types of footwear sole structure components may also be molded. For example, many types of footwear include a separate midsole. In many shoe designs, one or more side edges of a midsole may be exposed in a completed shoe. Some designs may also expose bottom regions of a midsole, e.g., through openings in an outsole. Midsole molds may be fabricated using techniques similar to those used to fabricate outsole molds.

It is known to form outsole masters having textures on surfaces that correspond to exposed surfaces of an outsole modeled by the master. Such textures may include surface features having a heights and/or widths that are too small to form efficiently through conventional machining techniques. Chemical etching is conventionally used to create such textures. Chemical etching requires use of highly caustic materials to chemically erode metal from surfaces of a master. Such chemicals are toxic and can be dangerous to handle. It may also be difficult to dispose of such chemicals in an environmentally responsible manner. Moreover, and apart from safety and environmental issues, there are limits on the quality of surface treatments achievable through chemical etching. For example, chemical etching tends to create rounded edges. It can thus difficult to chemically etch surface features with crisp lines and various other types of surface details.

SUMMARY

This Summary is provided to introduce a selection of concepts in a simplified form that are further described below in the Detailed Description. This Summary is not intended to identify key features or essential features of the invention.

In some embodiments, a sole structure may include contours defined by a plurality of outwardly projecting and/or inwardly projecting features. Outwardly projecting features may include lugs. Inwardly projecting features may include grooves or other types of depressions. The sole structure may include a protected region at least partially defined by side walls of one or more of the sole structure features. The sole structure may further include indicial features formed in the protected region. The indicial features may have shapes of information-conveying indicia.

In some embodiments, a footwear sole structure master may have one or more contours corresponding to one or more contours of a footwear sole structure modeled by that master. The master contours may be at least partially defined by master elements. The master elements may include a plurality of outwardly projecting elements having shapes corresponding to shapes of outwardly projecting features of the modeled footwear sole structure. The master elements may also or alternatively include an inwardly projecting element having a shape corresponding to a shape of an inwardly projecting feature of the modeled footwear sole structure. The master may include a master indicial region. The master indicial region may be at least partially defined by side walls of one or more of the master elements. The master may include indicial elements formed in the master indicial region. The indicial elements may have shapes of information-conveying indicia.

In some embodiments a footwear sole structure mold may include a metal body having a mold cavity therein. Portions of the mold cavity may have one or more contours corresponding to one or more contours of a footwear sole structure. The mold cavity contours may be at least partially defined by mold cavity elements. The mold cavity elements may include a plurality of depression elements having shapes corresponding to shapes of outwardly projecting features of the footwear sole structure. The mold cavity elements may also or alternatively include a raised element having a shape corresponding to a shape of an inwardly projecting feature of the footwear sole structure. The mold cavity may include a mold indicial region. The mold indicial region may be at least partially defined by side walls of one or more of the mold elements. The mold may include indicial elements formed in the mold indicial region. The indicial elements may have shapes of information-conveying indicia.

In some embodiments, a method includes receiving an unfinished footwear sole structure master. The received sole structure master may have contours corresponding to contours of a modeled footwear sole structure. Textures may be formed on one or more surfaces of the received master using a laser. The formed texture(s) may comprise a three-dimensional relief resulting from the removal of material by the laser.

Additional embodiments are described herein.

BRIEF DESCRIPTION OF THE DRAWINGS

Some embodiments are illustrated by way of example, and not by way of limitation, in the figures of the accompanying drawings and in which like reference numerals refer to similar elements.

FIGS. 2A1, 2B1 and 2C1 are enlarged area cross-sectional views, taken from the locations indicated in FIG. 1A, showing indicial features in the footwear sole structure of FIG. 1A.

FIGS. 2A2, 2B2 and 2C2 are enlarged area cross-sectional views, taken from locations similar to those indicated in FIG. 1A, showing indicial features in a footwear sole structure according to another embodiment.

FIGS. 4A1, 4B1 and 4C1 are enlarged area cross-sectional views, taken from the locations indicated in FIG. 3A, showing indicial elements in the sole structure master of FIG. 3A.

FIGS. 4A2, 4B2 and 4C2 are enlarged area cross-sectional views, taken from locations similar to those indicated in FIG. 3A, showing indicial elements in a sole structure master according to another embodiment.

FIGS. 6A1, 6B1 and 6C1 are enlarged area cross-sectional views, taken from the locations indicated in FIG. 5A, showing indicial elements in the mold of FIG. 5A.

FIGS. 6A2, 6B2 and 6C2 are enlarged area cross-sectional views, taken from locations similar to those indicated in FIG. 5A, showing indicial elements in a sole structure according to another embodiment.

DETAILED DESCRIPTION

Figure 1A:
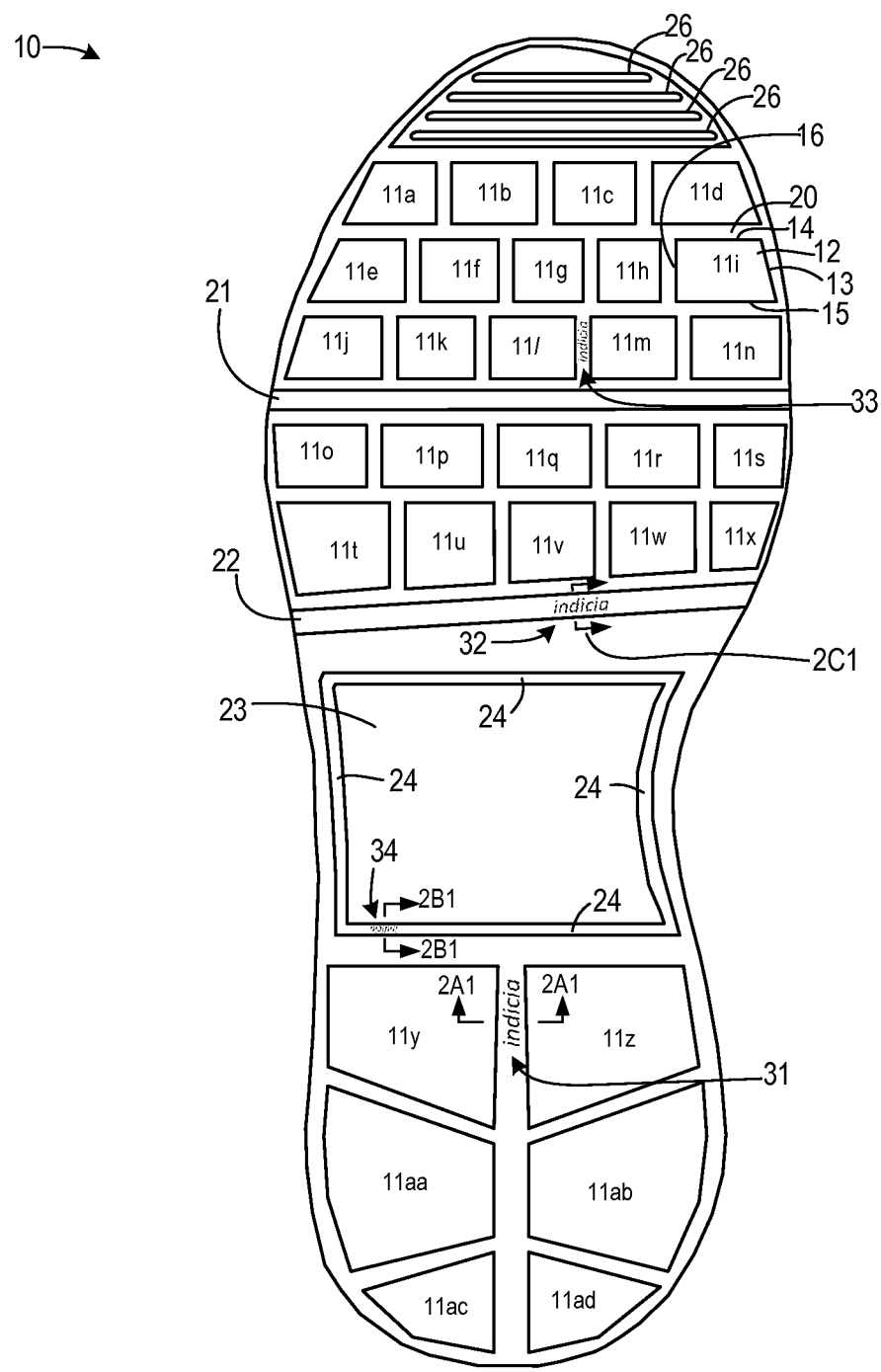
FIG. 1A is a plan view showing a bottom side of a footwear sole structure.

In at least some embodiments, a master for a footwear sole structure includes indicial elements located in one or more master indicial regions. When a mold is fabricated using the sole structure master, indicial elements corresponding to the indicial elements of the master are formed in that mold. The mold indicial elements are formed in mold indicial regions corresponding to the one or more master indicial regions. When a footwear sole structure is molded using the mold, the indicial elements of the mold create indicial features in the sole structure. The sole structure indicial features have shapes corresponding to shapes of the master indicial elements. Those sole structure indicial features are formed in one or more protected regions that correspond to the master indicial regions and to the mold indicial regions.

The indicial features of the sole structure may have shapes of indicia that can convey information. Those indicia may include letters, numbers and/or other characters. The letters may be letters of an alphabet for English or for another western language. The letters and/or numbers may be characters of one or more other languages (e.g., Greek, Russian, Arabic, Chinese, Japanese, Korean, Hindi, etc.). The indicia may include symbols (e.g., punctuation, stars, product logos, symbols indicating a material type, a symbol indicating a sport or other specific use for a footwear type, etc.). For example, an indicial feature on a sole structure of a shoe intended for tennis may include a symbol for a tennis ball or a tennis racquet.

A sole structure may be, or may include, an outsole. A bottom side of an outsole may include multiple features. For example, the outsole bottom side may include numerous features that project outward from one or more adjoining base surfaces of the bottom side. Outwardly projecting features may include lugs and other types of traction elements. A sole structure may also or alternatively include one or more inwardly projecting features. Such inwardly projecting features may include grooves and/or other types of depressions. Both outwardly projecting features and inwardly projecting features may include side walls.

An outsole may include one or more protected regions that are positioned such that those regions are at least partially protected from ground contact during normal movement (e.g., walking or running) over a generally flat surface. A protected region may be at least partially defined by side walls of one or more outsole features. For example, some or all of a protected region may be located near or on a side wall of an outwardly projecting or inwardly projecting feature. As another example, some or all of an outsole protected region may be situated between side walls of several closely-spaced lugs. As yet another example, a protected region may also or alternatively be located in a recessed portion of a groove or other depression and be bounded by sidewalls of that groove or depression. As a further example, some or all of a protected region may also or alternatively be located on a sidewall, e.g., a side wall of a depression, a side wall of a lug, etc.

An outsole is a convenient portion of a shoe on which to place indicia. For example, the outsole can normally be seen by simply turning a shoe upside down. Conversely, viewing various interior regions of a shoe may require unlacing or otherwise loosening a shoe, twisting and/or stretching an upper to access a particular interior region, etc. Moreover, many types of shoes are packaged by stuffing the shoe interior with paper or other material to maintain the shape of the shoe prior to sale. Such material must usually be removed in order to view interior regions of the shoe. If information is located within a shoe interior, a potential buyer of that shoe may be forced to remove the stuffing before accessing such information.

Positioning indicial features in outsole protected regions offers several advantages. An indicial feature located in a protected region of an outsole is less likely to contact the ground during walking or other movement. As a result, ground surface abrasion is less likely remove or damage that indicial feature. Moreover, an indicial feature located in a protected region may be conveniently viewed while remaining unobtrusive. For example, some outsoles include numerous features that are both functional (e.g., provide traction) and aesthetic. It may be desirable to include indicia on such an outsole that provides information such as shoe size, shoe model, outsole material, intended use, etc. However, the presence of such indicia could potentially disrupt aesthetic aspects of the outsole. If that indicia is located in a protected region, however, it may be at least partially hidden unless the protected region is viewed from a particular angle. In this way, the indicia may be less likely to distract from the desired aesthetic effect of other portions of the outsole.

Figure 1B:
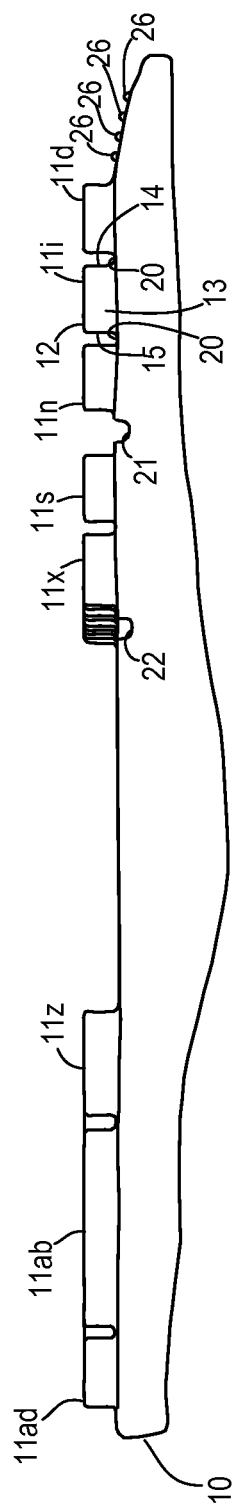
FIG. 1B is a medial side view of the footwear sole structure of FIG. 1A.

FIG. 1A is a plan view showing a bottom of a sole structure 10 according to at least some embodiments. FIG. 1B is a medial side view of sole structure 10. Sole structure 10 is an outsole. FIG. 1A shows portions of sole structure 10 that contact a ground surface when a wearer of a shoe incorporating sole structure 10 stands, walks, runs or otherwise moves.

Features of sole structure 10 includes lugs 11a through 11ad. For convenience, lugs 11a through 11ad are collectively referred to as "lugs 11" and an arbitrary one of lugs 11a through 11ad is referred to as a "lug 11." Each of lugs 11 projects outward from adjoining base surfaces of sole structure 10. For example, and as seen in FIG. 1B, lug 11i includes a bottom surface 12, a medial side wall 13, a front side wall 14 and a rear side wall 15. Lug 11i further includes a lateral side wall 16 (FIG. 1A). Each of side walls 13-16 extends from an adjacent portion of base surface 20 to bottom surface 12. Each of the other lugs 11 similarly includes side walls extending between adjacent portions of base surface 20 and the bottom surface of the lug 11.

Lugs 11 are only some examples of lugs that may be included on a sole structure according to some embodiments. In other embodiments, for example, lugs may be larger, smaller and/or have different shapes. Alternate lug shapes include, without limitation, lugs having a planar bottom surface with a different shape (e.g., more or fewer sides, rounded, etc.), lugs having a non-planar bottom surface, lugs terminating in sharp edges (e.g., wedge-shaped lugs) or in points, etc. A sole structure according to other embodiments may include more or fewer lugs and/or lugs in different distributions.

Lugs 11 are only examples of outwardly projecting features. As another example, sole structure 10 further includes a series of toe ridges 26. Sole structure 10 further includes several inwardly projecting features. For example, sole structure 10 includes flex grooves 21 and 22 in the forefoot region. Sole structure 10 further includes a midfoot depression 23 bounded by side walls 24. Grooves 21 and 22 and depression 23 are only examples of inwardly projecting features that may be present in sole structures according to various embodiments. Other embodiments may include more or fewer inwardly projecting features of different shapes and/or in different locations.

As can be appreciated from FIGS. 1A and 1B, the features of sole structure 10 define numerous protected regions. For example, protected regions are defined on portions of base surface 20 located between lugs 11. As another example, protected regions are defined in the recessed portions of grooves 21 and 22. As yet another example, protected regions are formed on side walls 24 of depression 23 and on side walls of lugs 11. A single protected region may include a portion of sole structure 10 between two outwardly projecting features (e.g., between two lugs 11), a portion of sole structure 10 on a side wall of an outwardly projecting feature, a portion of sole structure 10 on a side wall of an inwardly projecting feature, and/or a portion of sole structure 10 otherwise within an inwardly projecting feature.

Sole structure 10 includes indicial features in various protected regions. Indicial features may include small projections and/or recesses that have shapes corresponding to information-carrying indicia. For convenience, indicial features on sole structure 10 are indicated in the drawings as features in the shape of letters for the word "indicia." In other embodiments, however, indicial features and/or elements may have shapes of any of the other types of indicia indicated above. In drawings of a master and a mold corresponding to sole structure 10, which drawings are discussed below, indicial elements corresponding to the indicial features of sole structure 10 are similarly shown as elements in the shape of letters for the word "indicia."

In the embodiment of sole structure 10, an indicial feature 31 is located in a protected region between heel region lugs 11y and 11z. An indicial feature 32 is located in a protected region within groove 22. An indicial feature 33 is located in a protected region between forefoot region lugs 11l and 11m. An indicial feature 34 is located on one of side walls 24. In other embodiments, indicial features may be located in protected regions other than and/or in addition to one or more of those shown in FIG. 1A. Other sole structure 10 protected regions in which indicial features could be placed include, without limitation, protected regions located between any of lugs 11, side walls of any lug 11, anywhere within groove 21 and/or groove 22, anywhere on any of side walls 24, and between ridges 26.

Figure 1C:
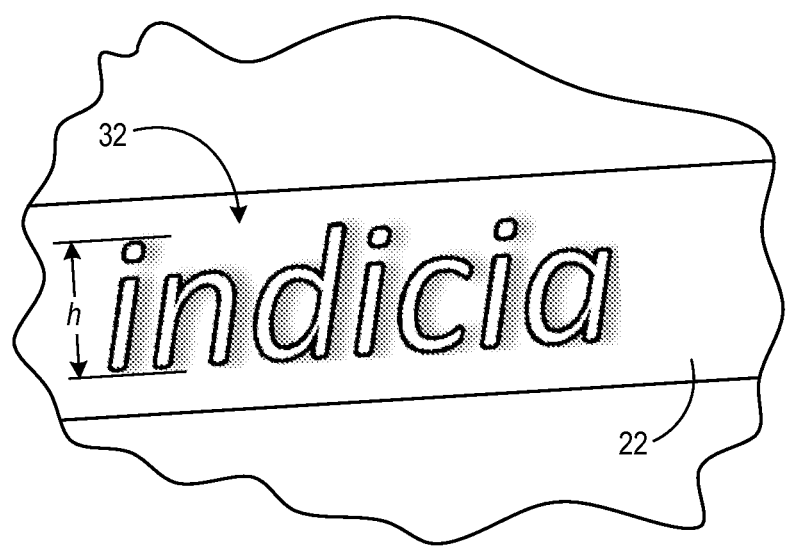
FIG. 1C is an enlarged plan view of a portion of the footwear sole structure of FIG. 1A.

The sizes of indicial features may vary. FIG. 1C is an enlarged plan view of a portion of the bottom side of sole structure 10 that includes indicial feature 32. In some embodiments, indicial features may have a height h of 1 millimeter or less in the viewing plane of the indicial feature. In some embodiments, indicial features may be larger, e.g., a viewing plane height h of 2 millimeters or less, a viewing plane height of 3 millimeters or less, etc.

FIGS. 2A1, 2B1 and 2C1 are enlarged area cross-sectional views from the locations indicated in FIG. 1A. In some embodiments, and as seen in FIGS. 2A1, 2B1 and 2C1, indicial features may include small projections and/or other regions that are raised relative to surrounding surfaces. Side walls and/or peaks of these raised regions may have shapes corresponding to outlines of indicia. For convenience, indicial features 31, 34 and 32 are shown in FIGS. 2A1, 2B1 and 2C1 as simple rounded polygons. A similar convention is followed in later drawing figures for master and mold elements corresponding to raised region indicial features. The appearance of an actual cross-section through an indicial feature or element would depend on the indicia represented by that indicial feature or element and where along the length and/or width of that indicial feature or element the sectioning plane intersects. Although a cross-sectional view is not provided with regard to indicial feature 33, indicial feature 33 can include raised regions that are similar to those used for indicial features 31, 34 and 32, but that have reduced viewing plane height h so as to fit within a narrower protected region.

FIGS. 2A2, 2B2 and 2C2 are enlarged area cross-sectional views of a portion of a sole structure according to an alternate embodiment. Except as shown in FIGS. 2A2 through 2C2, that alternate embodiment is similar to the embodiment of sole structure 10. FIGS. 2A2, 2B2 and 2C2 are taken from locations in that alternate embodiment similar to those indicated in FIG. 1A. In the alternate embodiment of FIGS. 2A2, 2B2 and 2C2, however, indicial features may include small depressions in surrounding surfaces such as base surface 20'. Side walls and/or troughs of these small depressions have shapes corresponding to outlines of indicia. Indicial feature 31' is located in a protected region between two lugs 11y' and 11z'. Indicial feature 34' is located in a protected region on side wall 24' between depression 23' and base surface 20'. Indicial feature 32' is located in a protected region within a groove 22'. For convenience, indicial features 31', 34' and 32' are shown in FIGS. 2A2, 2B2 and 2C2 as spaces having simple rounded polygonal outlines. A similar convention is followed in later drawing figures for master and mold elements corresponding to depressed region indicial features.

In sole structures according to some embodiments, indicial features include raised features such as those shown in FIGS. 2A1, 2B1 and 2C1, together with depressed features such as those shown in FIGS. 2A2, 2B2 and 2C2. Both types of indicial features may be used for adjacent indicial features (e.g., for indicial features representing adjacent letters, characters or symbols in a single word or other message) and/or within a single indicial feature (e.g., for an indicial feature representing a single character).

In at least some embodiments, sole structure 10 is formed using a mold. Synthetic rubber and/or other material is placed into that mold and subjected to heat and pressure so as to cause the material to flow into elements within a mold cavity. An example mold for use in forming sole structure 10 is described below in connection with FIGS. 5A1 through 6C1. In at least some embodiments, such a mold is cast from molten metal. As a first step in casting such a mold, a sole structure master is created. That master models sole structure 10 and forms a three-dimensional replica of sole structure 10. Once the master has been created, silicone or other similar material is poured over the master so as to create a silicone form have a contour that is an inverse of the master contours. The contours of the silicone form are also the contours that will be created in a mold cavity of the cast sole structure mold. Subsequently, silicate particles (e.g., sand) or ceramic material is placed into the silicone form to create a plug. The plug is then removed from the silicone form and used to cast the sole structure mold from molten metal.

Figure 3A:
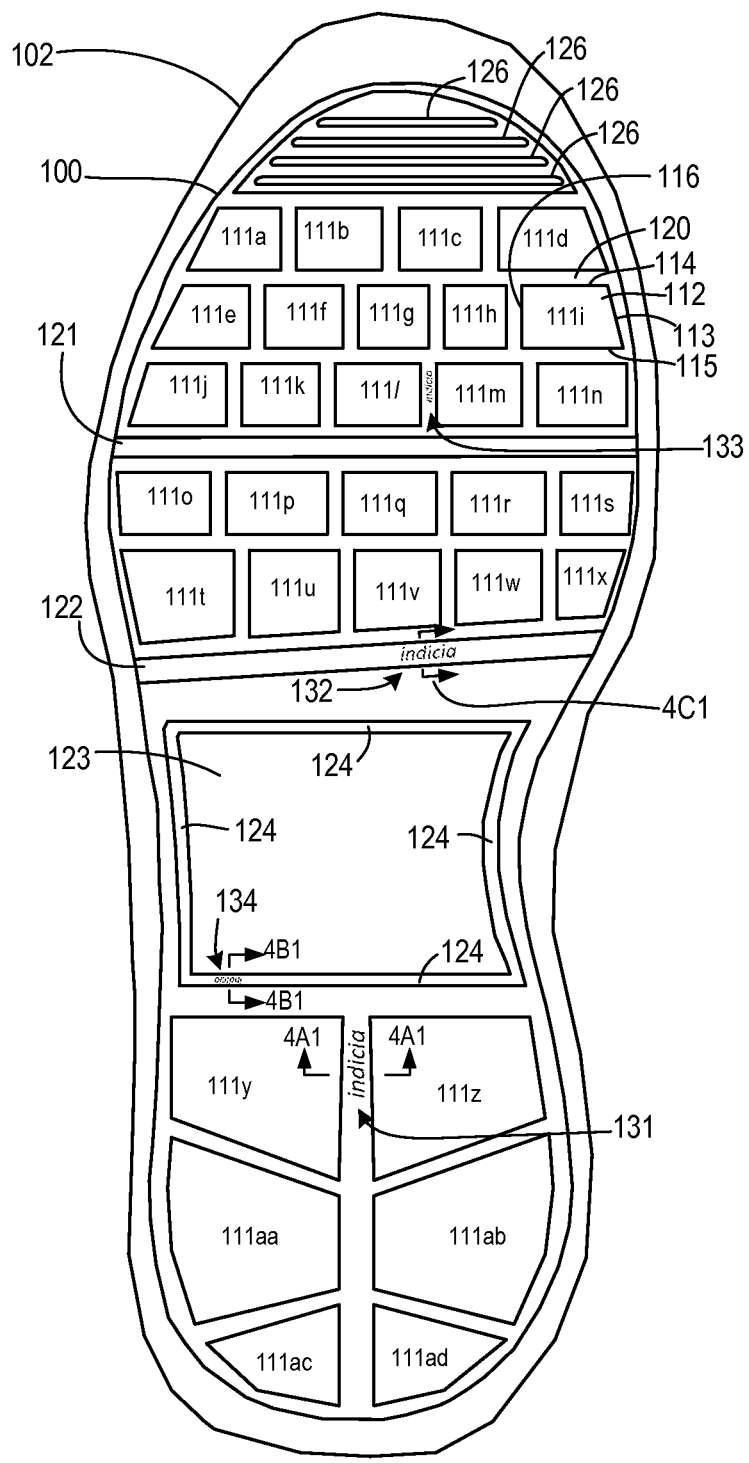
FIG. 3A is a plan view of a bottom side of a sole structure master corresponding to the footwear sole structure of FIG. 1A.
Figure 3B:
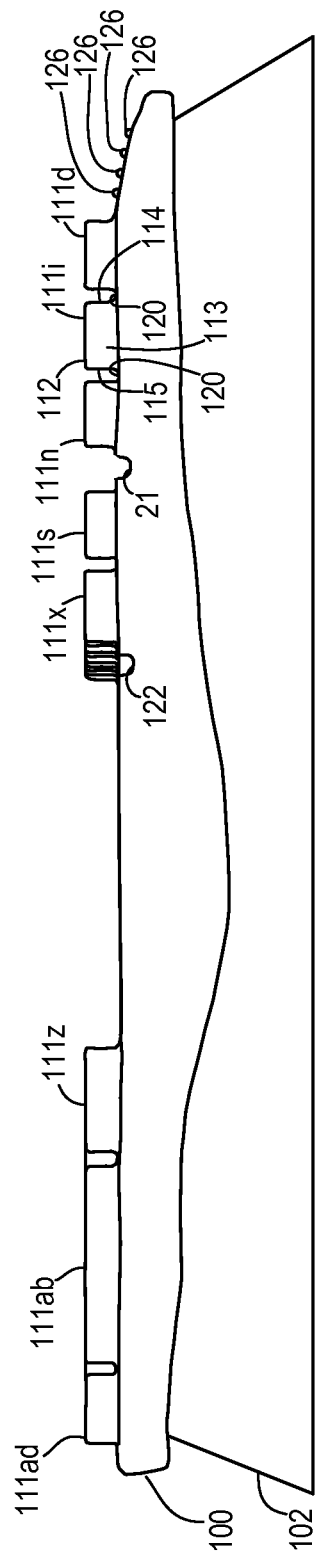
FIG. 3B is a medial side view of the sole structure master of FIG. 3A.

FIGS. 3A and 3B show a sole structure master 100 that models sole structure 10. Master 100 is used to create a mold corresponding to sole structure 10. FIG. 3A is a plan view showing a bottom side of master 100 attached to a bracket 102. FIG. 3B is a medial side view of master 100 attached to bracket 102. In the embodiment shown, master 100 is a one-piece metal component having contours corresponding to the contours of the bottom side and outer edges of sole structure 10. For example, master 100 includes a plurality of lug elements 111a through 111ad that respectively correspond to lugs 11a through 11ad of sole structure 10. Each lug element 111 has a bottom surface and side walls in the same shape and in the same relative configuration as the bottom surface and side walls of the corresponding lug 11. For instance, and as seen in FIG. 3B, lug element 111i includes a bottom surface 112, a medial side wall 113, a front side wall 114 and a rear side wall 115. Lug element 111i further includes a lateral side wall 116 (FIG. 3A). Each of side walls 113-116 extends from an adjacent portion of a base surface 120 to bottom surface 112. Each of the other lugs elements 111 similarly includes side walls extending between adjacent portions of base surface 120 and the bottom surface of that lug element 111.

Additional elements of master 100 contribute to creating contours that correspond to the contours of sole structure 10. Groove elements 121 and 122 have shapes and locations corresponding to the shapes and locations of grooves 21 and 22. Depression element 123 and side walls 124 have shapes and locations corresponding to the shapes and locations of depression 23 and side walls 24. Toe ridge elements 126 have shapes and locations corresponding to the shapes and locations of toe ridges 26.

Master 100 further includes indicial elements having shapes and locations corresponding to indicial features of sole structure 10. An indicial element 131 has a three-dimensional shape corresponding to the three-dimensional shape of indicial feature 31 and is located in a position corresponding to the position of indicial feature 31 (i.e., in a region between lug elements 111y and 111z). An indicial element 132 has a three-dimensional shape corresponding to the three-dimensional shape of indicial feature 32 and is located in a position corresponding to the position of indicial feature 32 (i.e., in a region inside groove element 22). An indicial element 133 has a three-dimensional shape corresponding to that of indicial feature 33 and is located in a position corresponding to the position of indicial feature 33 (i.e., in a region between lug elements 111l and 111m). An indicial element 34 has a three-dimensional shape corresponding to the three-dimensional shape of indicial feature 34 and is located in a position corresponding to the position of indicial feature 34 (i.e., on one of side walls 124). In other embodiments in which a sole structure includes indicial features in different protected regions and/or of different sizes and/or shapes, a corresponding sole structure master will similarly include indicial elements having corresponding shapes and locations.

FIGS. 4A1, 4B1 and 4C1 are enlarged area cross-sectional views from the locations indicated in FIG. 3A. In some embodiments, and as seen in FIGS. 4A1, 4B1 and 4C1, indicial elements of master 100 include small projections or other regions that are raised relative to surrounding surfaces (e.g., relative to base surface 120). Side walls and/or peaks of these raised regions may have shapes corresponding to outlines of indicia.

FIGS. 4A2, 4B2 and 4C2 are enlarged area cross-sectional views of an alternate embodiment sole structure master corresponding to an alternate embodiment sole structure. Except as shown in FIGS. 4A2 through 4C2, those alternate embodiments are respectively similar to master 100 and to sole structure 10. FIGS. 4A2, 4B2 and 4C2 are taken from locations in the alternate embodiment master that are similar to those indicated in FIG. 4A. In the alternate embodiment master of FIGS. 4A2, 4B2 and 4C2, however, indicial elements may include depressions in a base surface 120' or in another surrounding surface. Side walls and/or troughs of these depressions have shapes corresponding to outlines of indicia. Indicial element 131' is located in a master indicial region located between two lug elements 111y' and 111z'. Indicial element 134' is located in a master indicial region located on a sidewall 124' connecting a depression 123' and base surface 120'. Indicial element 132' is located in a groove element 122'.

Master 100 may be machined from metal (e.g., aluminum, stainless steel). Indicial elements and/or textures may be added to surfaces of master 100 by further machining and/or using other techniques. In some embodiments, for example, indicial elements and/or textures may be formed using laser engraving and/or texturing. Sole structure masters may also or alternatively be textured using chemical etching techniques.

Although master 100 is a single piece, in other embodiments a sole structure master may comprise multiple pieces that are assembled prior to use in forming a mold. In some embodiments, multiple sole structure masters may be used to form a mold for a corresponding sole structure. For example, a particular sole structure may include multiple outsole components that are separated from one another on the sole structure (e.g., a forefoot outsole and a heel outsole respectively attached to forefoot and heel regions of a midsole), and a separate master may be used for each of those outsole components.

Figure 5A:
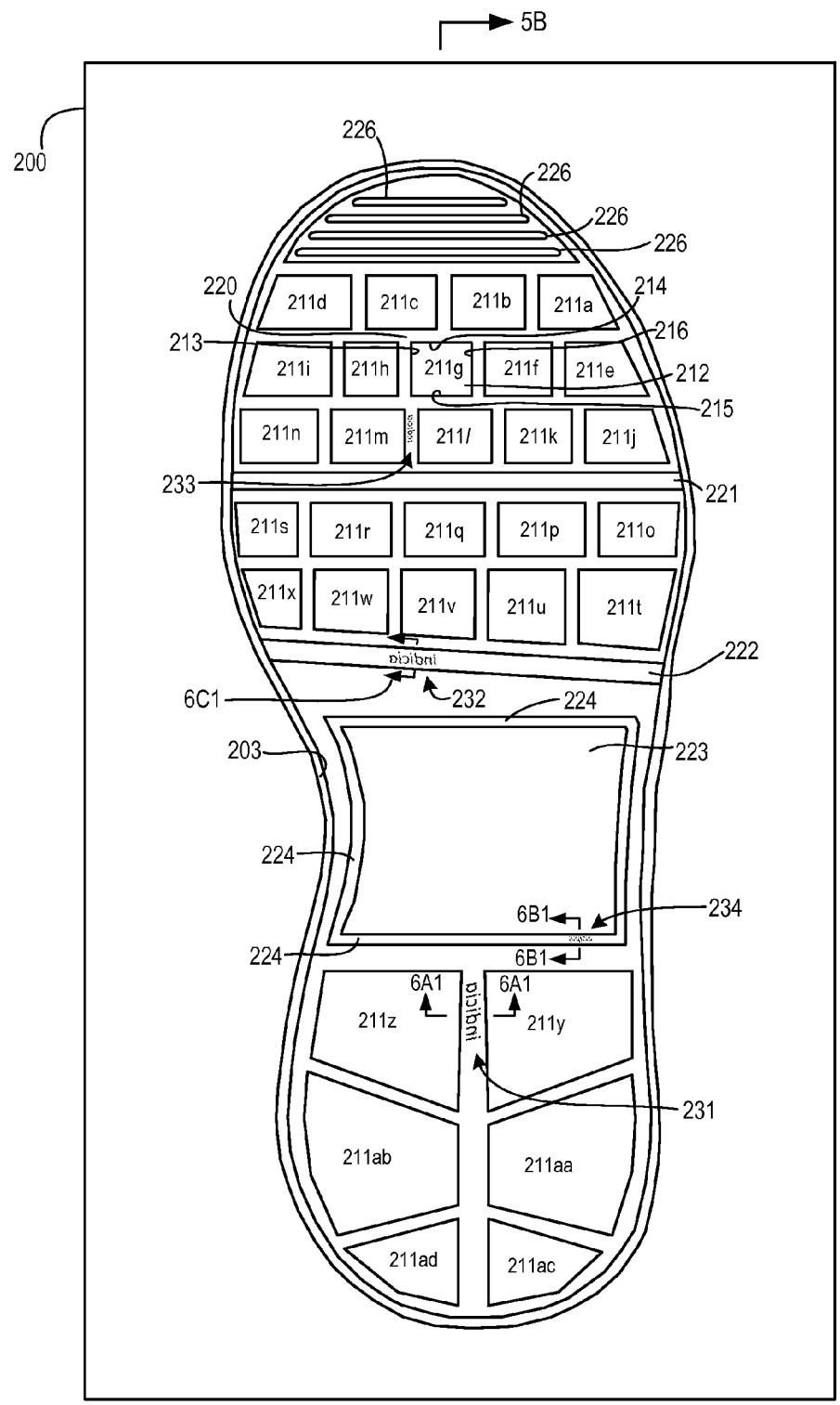
FIG. 5A is a plan view of a footwear sole structure mold corresponding to the footwear sole structure of FIG. 1A and to the sole structure master of FIG. 3A.
Figure 5B:
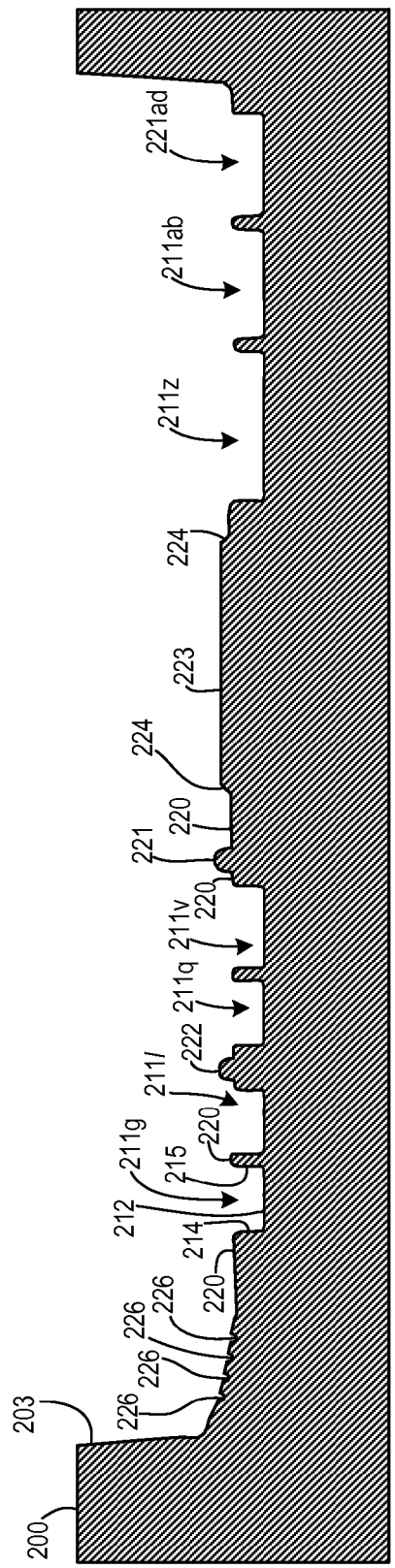
FIG. 5B is an area cross-sectional view, taken from the location indicated in FIG. 5A, of the mold of FIG. 5A.

FIGS. 5A and 5B show a mold 200 that corresponds to sole structure 10. Mold 200 may be created using master 100 and the procedure described above. FIG. 5A is a plan view of mold 200 and shows a mold cavity 203. FIG. 5B is an area cross-sectional view of mold 200 from the location indicated in FIG. 5A. In the embodiment shown, mold 200 is a one-piece cast metal component. The bottom and bottom edges of cavity 203 have contours corresponding to the contours of the bottom side and outer edges of sole structure 10 and to the bottom side and outer edges of master 100. For example, mold 200 includes a plurality of lug elements 211*a* through 211*ad* that respectively correspond to lugs 11*a* through 11*ad* of sole structure 10 and that also respectively correspond to lug elements 111*a* through 111*ad* of master 100.

Each lug element 211 has a bottom surface and side walls in the same shape and in the same relative configuration as the bottom surface and side walls of the corresponding lug 11. Unlike lug elements 111 of master 100, however, lug elements 211 of mold 200 have shapes that are the inverses of the shapes of lugs 11. In particular, each lug element 211 of mold 200 is a depression in the bottom of mold cavity 203. For instance, and as seen in FIG. 5B, lug element 211*g* includes a bottom surface 212, a front side wall 214 and a rear side wall 215. Lug element 211*g* further includes a medial side wall 213 and a lateral side wall 216 (FIG. 5A). Each of side walls 213-216 extends from an adjacent portion of a base surface 220 to bottom surface 212. Each of the other lugs elements 211 similarly includes side walls extending between adjacent portions of base surface 220 and the bottom surface of that lug element 211.

Additional elements of mold 200 contribute to creating contours that correspond to the contours of sole structure 10 and to the contours of master 100. Elements 221 and 222 have three-dimensional shapes and locations corresponding to the three-dimensional shapes and locations of grooves 21 and 22 in outsole structure 10 and to the three-dimensional shapes and locations of groove elements 121 and 122 in master 100. Because elements of mold 200 have shapes that are the inverses of the shapes of the corresponding elements in master 100 and of the corresponding features in sole structure 10, elements 221 and 222 are ridges instead of grooves. Element 223 and side walls 224 have three-dimensional shapes and locations corresponding to the three-dimensional shapes and locations of depression 23 and side walls 24 of sole structure 10 and to the three-dimensional shapes and locations of depression element 123 and sidewalls 124 of master 100. Because of the inverse nature of mold 200 shapes, however, element 223 is a raised region instead of a depression. Elements 226 have three-dimensional shapes and locations corresponding to the three-dimensional shapes and locations of toe ridges 26 and to the three-dimensional shapes and locations of toe ridge elements 126. Elements 226 are grooves in mold 200 instead of ridges.

Mold 200 further includes indicial elements having three-dimensional shapes and locations corresponding to those of indicial features of sole structure 10 and indicial elements of master 100. An indicial element 231 has a three-dimensional shape corresponding to the three-dimensional shape of indicial feature 31 and to the three-dimensional shape of indicial element 131 and is located in a position corresponding to that of indicial feature 31 (i.e., in a raised region between depression lug element 211*y* and 211*z*). An indicial element 232 has a three-dimensional shape corresponding to the three-dimensional shape of indicial feature 32 and to the three-dimensional shape of indicial element 132 and is located in corresponding position (i.e., on a peak of ridge element 222). An indicial element 233 has a three-dimensional shape corresponding to the three-dimensional shape of indicial feature 33 and to the three-dimensional shape of indicial element 133 and is located in a corresponding position (i.e., between depression lug elements 211*l* and 211*m*). An indicial element 234 has a three dimensional shape corresponding to the three-dimensional shape of indicial feature 34 and to the three-dimensional shape of indicial element 134 and is located in a corresponding position (i.e., on one of side walls 224). In other embodiments in which a sole structure includes indicial features in different protected regions and/or of different sizes and/or shapes, a corresponding mold will similarly include indicial elements having corresponding shapes and locations.

FIGS. 6A1, 6B1 and 6C1 are enlarged cross-sectional views from the locations indicated in FIG. 5A. In some embodiments, and as seen in FIGS. 6A1, 6B1 and 6C1, mold indicial elements may include small depressions in base surface 220 or in another surrounding surface and that correspond to (and are the inverses of) raised regions of corresponding sole structure indicial features and raised regions of corresponding master indicial elements. Side walls and/or floors of these depressions may have shapes corresponding to outlines of indicia.

FIGS. 6A2, 6B2 and 6C2 are enlarged area cross-sectional views of portions of a mold according to another embodiment, which mold corresponds to a master and to a sole structure according to that alternate embodiment. Except as indicated below, the mold, master and sole structure of that alternate embodiment are respectively similar to mold 200, master 100 and sole structure 10. FIGS. 6A2, 6B2 and 6C2 are taken from locations in the mold of that alternate embodiment that are similar to the locations indicated in FIG. 5A. In the alternate embodiment of FIGS. 6A2, 6B2 and 6C2, indicial elements may include small projections or other raised regions that correspond to small depressions of sole structure indicial features and master indicial elements. Side walls and/or peaks of these depressions may have shapes corresponding to outlines of indicia. Indicial element 231' is located in a mold indicial region between lug depression elements 211*z'* and 211*y'*. Indicial element 234' is located in a mold indicial region on a side wall 224' connecting a raised region of mold element 223' and base surface 220'. Indicial element 232' is located in a mold indicial region located on a ridge element 222'.

Several types of protected regions are defined by surrounding side walls of one or more sole structure features. For example, the protected region in which indicial feature 31 is located is defined by the side walls of lugs 11*y* and 11*z*. As another example, the protected region in which indicial feature 32 is located is defined by the side walls of groove 22. In some embodiments, a protected region defined by two sidewalls has width of 10 mm or less between those two side walls. In some embodiments, that width may be 5 mm or less. In some embodiments, that width may be 2 mm or less.

In the embodiments described thus far, the sole structure having protected regions and indicial features within those regions is an outsole. In some embodiments, a sole structure with protected region indicial features may include components other than or in addition to one or more outsole components. For example, a sole structure may include or may consist of one or more midsole components. The midsole component(s) may also include protected regions and have indicial features located with such regions. Those midsole component(s) may be formed using a mold having contours corresponding to the contours of the midsole component(s). Such molding of midsole component(s) may occur in conjunction with molding one or more associated outsole components or may occur separately. Molds corresponding to midsole components having indicial features in protected regions may be cast using midsole masters that also correspond to such midsole components. Those molds and midsole masters may include elements corresponding to the midsole indicial features and protected regions.

Figure 7A:
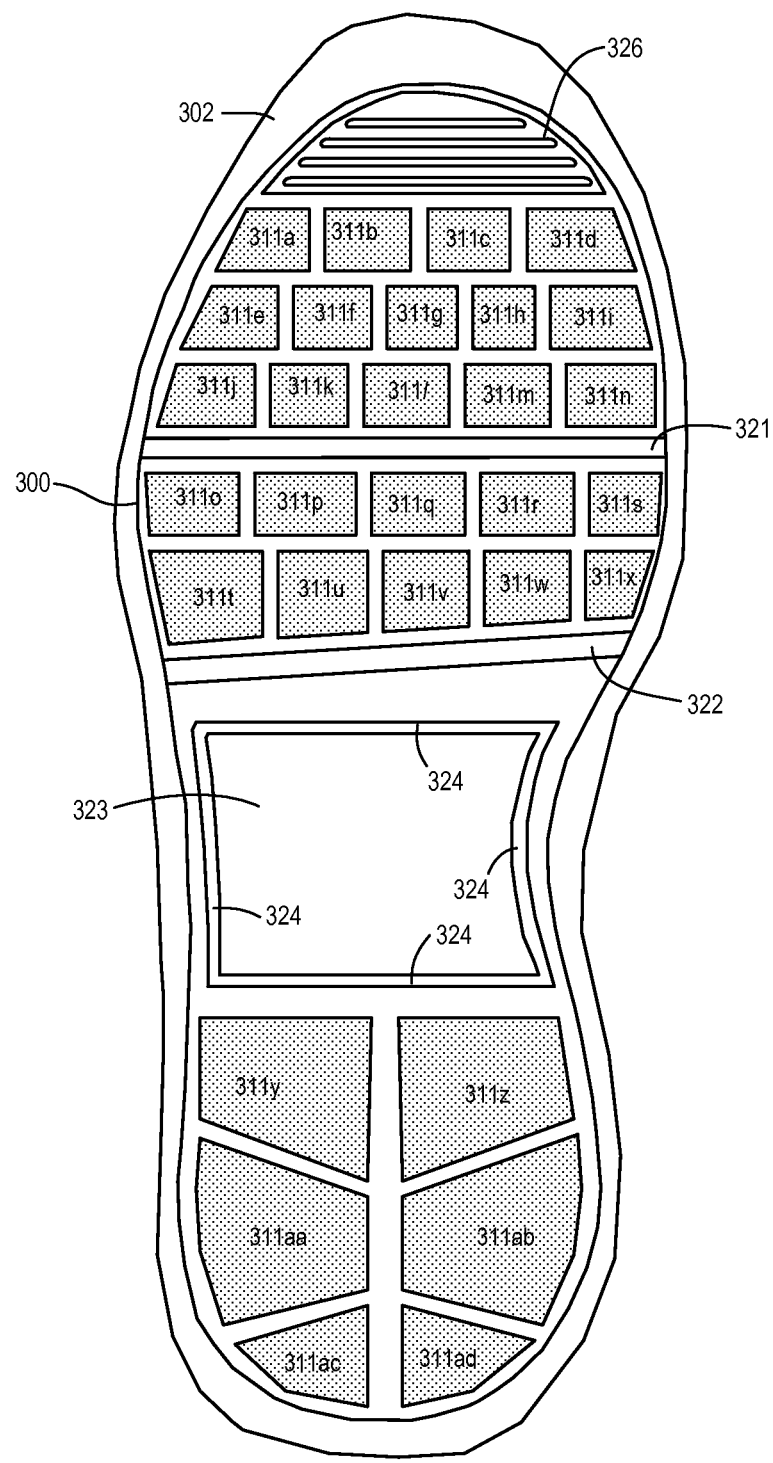
FIG. 7A is a plan view showing a bottom side of a sole structure master according to another embodiment.
Figure 7B:
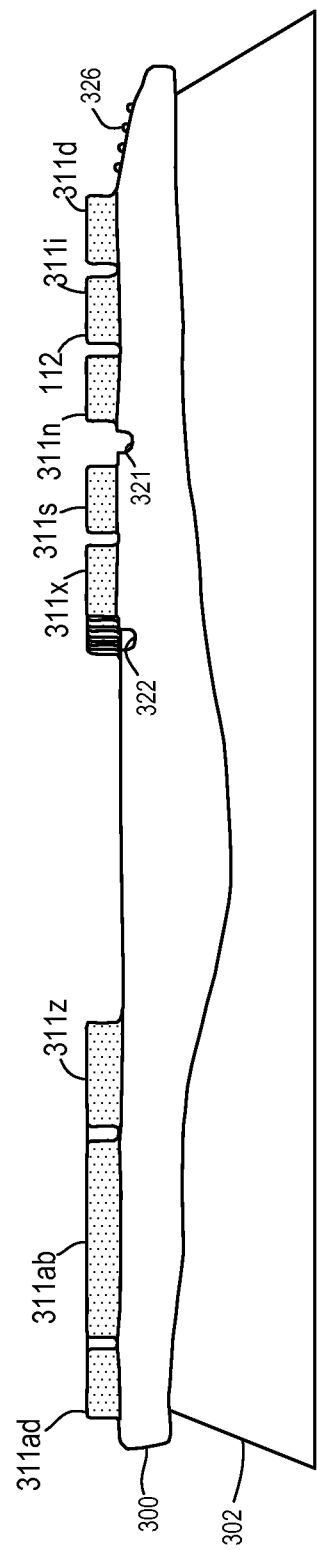
FIG. 7B is a medial side view of the sole structure master of FIG. 7A.

FIGS. 7A and 7B show a sole structure master 300 according to another embodiment. FIG. 7A is a plan view showing a bottom side of master 300 attached to a bracket 302. FIG. 7B is a medial side view of master 300 attached to bracket 302. Similar to master 100 of FIGS. 3A and 3B, master 300 is a one-piece metal component that models an outsole. Master 300 has contours corresponding to the contours of the bottom side and outer edges of the modeled outsole. For example, master 300 includes a plurality of lug elements 311a through 311ad corresponding to lugs of the modeled sole structure. In particular, each lug element 311 has a bottom surface and side walls in the same shape and in the same relative configuration as the bottom surface and side walls of the corresponding modeled sole structure lug. Additional elements of master 300 also have contours corresponding to contours of the modeled sole structure, including groove elements 321 and 322, depression element 323, side walls 324, and toe ridge elements 326.

In the embodiment of master 300, textures have been formed on one or more surfaces using a laser. That texture, which is represented by stippling in FIGS. 7A and 7B, extends over the bottom surfaces of lugs 300 and on the medial side edges of lugs 311d, 311i, 311n, 311s, 311x, 311z, 311ab and 311ad. In other embodiments, and as discussed below, laser texturing may cover other surfaces.

The laser textured surfaces of master 300 include three-dimensional reliefs formed in those surfaces. In particular, adjacent regions of a textured surface have different relative heights. In some embodiments, a relief may comprise individual surface features having dimensions of 100 microns (100 µm) or less in directions across the textured surface. In some embodiments, height differences in between adjacent regions of a laser-textured surface may be 50 microns or less.

Figure 7C:
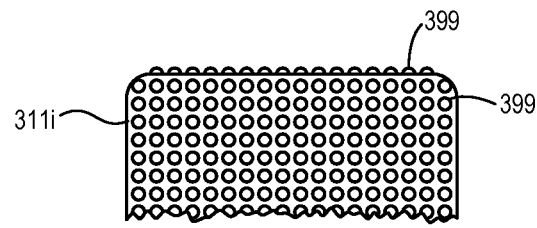
FIG. 7C is an enlarged view of a portion of the sole structure master of FIG. 7A.

FIG. 7C is an enlarged view of the medial side of lug element 311i. In the embodiment of master 300, the textured surfaces comprise a regularly repeating pattern of evenly spaced circular bumps 399. To form this pattern, a laser is used to remove material of master 300 between bumps 399. Machines for performing laser texturing are known in the art and are available from various manufacturers. In general, such machines operate by moving a laser across the surface of a workpiece. The position of the laser focal point, the laser spot size and the laser dwell time in a particular location may be controlled by a computer. In some types of equipment, the workpiece may be secured to a turntable or other movable platform, with both the work piece orientation and position of the laser focal point controllable by a computer.

The pattern shown in FIG. 7C is merely one example of a three-dimensional relief that can be formed on a sole structure master using a laser. In some embodiments, a pattern may comprise a regularly repeating pattern of depressions. For example, circular depressions could be formed instead of or in addition to circular bumps. In some embodiments, a texture may comprise bumps and/or depressions having different shapes. A pattern need not be regularly repeating. For example, a texture pattern could have a random appearance similar to that of a leather grain. In some embodiments, multiple different textures may be laser formed in a sole structure master. Such different textures could occupy distinct regions of a sole structure master exposed surface and/or may overlap.

In some embodiments, "gray scaling" could be used to form a pictorial image in one or more surfaces of a sole structure master. For example, surface depths and/or surface roughnesses could be created in a pattern on a master surface so as to form a pictorial representation of a person, object, logo, etc.

In some embodiments, at least 50% of the exposed surfaces of a sole structure master are textured using a laser. Although FIGS. 7A-7C 300 only show texturing on bottom surfaces of lug elements 311 and on medial side surfaces of certain lug elements, texturing could be laser formed on other surfaces. For example, some or all of the surface of depression element 323, some or all of side walls 324, some or all of the surfaces surrounding side walls 324, and/or some of all of base surfaces between lug elements 311, etc., could be laser textured. In some elements, other lug element sides could be laser textured. For example, the lateral sides of lug elements 311 on the lateral side of master 300, the front sides of lug elements 311 on the front of master 300 and/or the rear sides of lug elements 311 on the rear of master 300 could have texture(s) formed by a laser. Depending on the space between lugs, the angle of the lug side walls and the capability of a particular laser texturing machine, some or all of interior lug element sidewalls facing other lug element sidewalls (e.g., the lateral side wall of lug element 311z) could have textures applied using a laser.

Master 300 models a complete outsole. In other embodiments, a laser-textured master may only model a portion of an outsole. In still other embodiments, a laser-textured master may model a midsole or a portion of a midsole.

Although laser texturing of complex three dimensional shapes is known, applicant is not aware of laser texturing being used for sole structure masters. Laser texturing of molds is also known. Laser texturing of cast footwear molds is often impractical, however. Dimensional tolerances for cast metal components may exceed the range of workpiece dimensional variation that can be cost-effectively accommodated by a laser texturing machine. Moreover, laser texturing can be time consuming. If numerous molds are to be fabricated from a single master, it is much more cost effective to texture the master with a laser instead of using a laser to texture each of the molds.

In some embodiments, laser texturing of a master could be combined with indicia such as is described in connection with previous embodiments.

Figure 8:
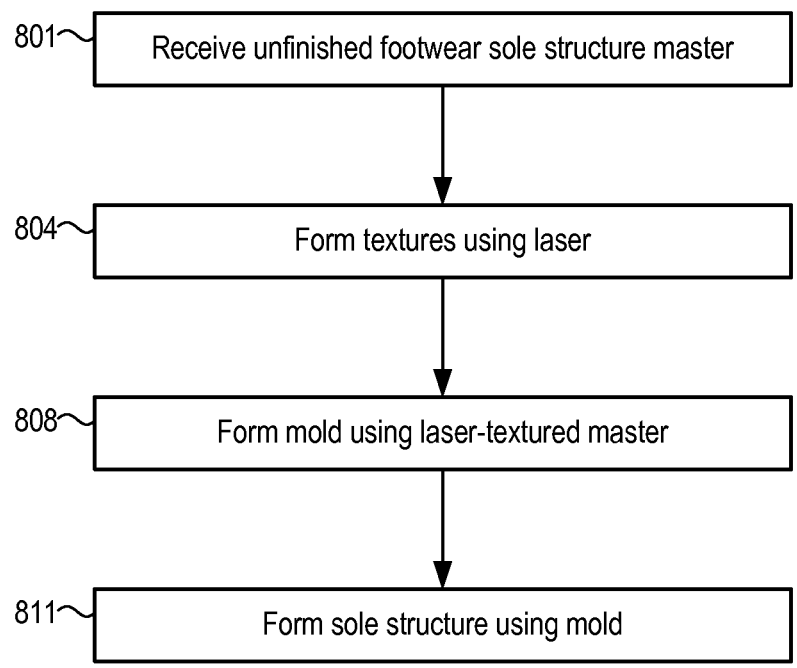
FIG. 8 is a flow chart showing steps in a method according to some embodiments.

FIG. 8 is a flow chart showing steps in a method according to some embodiments. In step 801, an unfinished footwear sole structure master is received. That unfinished master may model a sole structure or a portion thereof. For example, the master may model an outsole or a portion of an outsole or may model a midsole or a portion of a midsole. The sole structure master may include contours that correspond to the contours of the modeled sole structure or sole structure portion. In some embodiments, the received unfinished master may be a master such as master 300 prior to forming of textures on the master surfaces.

In step 804, textures are formed on one or more surfaces of the unfinished master. In particular, a laser is used to remove material from those surfaces. This material removal creates a three-dimensional relief on the textured surfaces. This relief may include one or more patterns.

In step 808, a sole structure mold is formed using the laser-textured master. In some embodiments, step 808 comprises pouring silicone or other similar material is over the laser-textured master so as to create a silicone form having contours that are inverses of the master contours. The contours of the silicone form are also the contours that will be created in a mold cavity of the cast sole structure mold. Subsequently, silicate particles (e.g., sand) or ceramic material is placed into the silicone form to create a plug. The plug is then removed from the silicone form and used to cast the sole structure mold from molten metal. The resulting mold will include textures corresponding to the textures of the master.

In step 811, a sole structure is formed using the mold. This sole structure is the sole structure modeled by the laser-textured master resulting from step 804. In some embodiments, step 811 comprises placing synthetic rubber and/or other material into the mold and applying heat and pressure so as to cause the material to flow into elements within a mold cavity.

The foregoing description of embodiments has been presented for purposes of illustration and description. The foregoing description is not intended to be exhaustive or to limit embodiments of the present invention to the precise form disclosed, and modifications and variations are possible in light of the above teachings. The embodiments discussed herein were chosen and described in order to explain the principles and the nature of various embodiments and their practical application to enable one skilled in the art to utilize the present invention in various embodiments and with various modifications as are suited to the particular use contemplated. For example, the sole structures, sole structure masters and sole structure molds shown in the drawings are only examples of sole structures, sole structure masters and sole structure molds according to some embodiments. Sole structures, sole structure masters and sole structure molds in other embodiments may include different types and/or combinations of features. Any and all combinations, subcombinations and permutations of features from above-described embodiments are the within the scope of the invention.

The invention claimed is:

1. An article of manufacture comprising a sole structure master, wherein
   the sole structure master has one or more contours corresponding to one or more contours of a modeled footwear sole structure,
   the sole structure master contours are at least partially defined by master elements, the master elements including at least one of
      a plurality of outwardly projecting elements having shapes corresponding to shapes of outwardly projecting features of the modeled footwear sole structure, and
      an inwardly projecting element having a shape corresponding to a shape of an inwardly projecting feature of the modeled footwear sole structure,
   the sole structure master includes a master indicial region, the master indicial region at least partially defined by side walls of one or more of the master elements, and
   the sole structure master includes indicial elements formed in the master indicial region, the indicial elements having shapes of information-conveying indicia,
   the sole structure master elements comprise a plurality of outwardly projecting lug elements having three-dimensional shapes corresponding to three-dimensional shapes of outsole lugs of the modeled footwear sole structure,
   the master indicial region is at least partially surrounded by side walls of the lug elements, and
   the master indicial region comprises a location on a side wall of one of the lug elements.

2. The article of manufacture of claim 1, wherein the indicial elements comprise elements raised relative to a base surface in the master indicial region, the indicial elements having shapes corresponding to at least one of letters, numbers and symbols.

3. The article of manufacture of claim 1, wherein the indicial elements comprise depressions in a base surface in the master indicial region, the indicial elements having shapes corresponding to at least one of letters, numbers and symbols.

4. The article of manufacture of claim 1, wherein the master elements include a groove element and the master indicial region is at least partially surrounded by the side walls of the groove element.

5. The article of manufacture of claim 4, wherein the indicial elements comprise raised elements contained within the groove element and having shapes corresponding to at least one of letters, numbers and symbols.

6. The article of manufacture of claim 4, wherein the indicial elements comprise depressions contained within the groove element and having shapes corresponding to at least one of letters, numbers and symbols.

7. The article of manufacture of claim 1, wherein the sole structure master has an outer shape corresponding to an outer perimeter of the modeled footwear sole structure, wherein the modeled footwear sole structure comprises an outsole, and wherein the sole structure master contours correspond to contours of a bottom of the outsole.

* * * * *